UNITED STATES PATENT OFFICE.

OTTO O. KARSCH, OF NEW YORK, N. Y.

COMPOSITION FOR ARTIFICIAL-WOOD ORNAMENTS.

SPECIFICATION forming part of Letters Patent No. 250,257, dated November 29, 1881.

Application filed October 22, 1881. (Specimens.)

*To all whom it may concern:*

Be it known that I, OTTO O. KARSCH, of New York, in the county and State of New York, have invented certain new and useful Improvements in Compositions for Artificial-Wood Ornaments; and I do hereby declare that the following is a full, clear, and exact description thereof.

The object of my invention is to furnish a composition from which ornaments may be molded that will not only resemble wood in appearance, but which will be durable, easily applied, and capable of receiving varnish, without the slightest injury.

I am fully aware that various attempts have been made to effect perfectly these objects; but I am not aware that success has altogether crowned such efforts, as some one or more of the materials or ingredients used have been of such a nature as to necessarily impair the quality or detract from the beauty of the ornaments made therefrom when they are finished—as, for instance, where sawdust is used, the varnish will cause the surface of the ornaments to become rough and uneven, thereby much impairing the artistic or æsthetic effect of the same. This, besides other difficulties hitherto experienced, I remedy by my composition, which I will now proceed to make known, so that others may avail themselves of the benefits of my discovery or invention.

I first take ten pounds of glue and thoroughly dissolve it in four quarts of water. I then take six pounds of rosin and dissolve or melt it in one quart of linseed-oil. After the glue and rosin have been brought to the proper state, as just mentioned, I unite them in one vessel and subject it to as strong a heat as the glue will stand without injury to its strength until the ingredients are thoroughly incorporated with each other, and to facilitate this end I constantly stir the composition, and while this is being done I also add such coloring-matter or pigments as may be desired. After this is done I add sifted whiting and plaster-of-paris until the proper consistency is obtained, and as to this a little experience will be the best guide. Care should, however, be taken that the whiting or plaster-of-paris should be evenly distributed and well worked in. The composition will now be ready to mold or put away for future use. Of course the molding should be done while the composition is warm and plastic. If put away for future use, it should be subjected to a steam bath, at which time scraps or pieces left from former moldings may be added, and nothing need be wasted.

The ornaments made from this composition will be very cheap, durable, smooth, and withal will take varnish without in any degree impairing their quality or appearance.

What I claim, and desire to secure by Letters Patent, is—

The within-described composition for making or molding imitation wood ornaments, consisting of glue, rosin, water, linseed-oil, and whiting and plaster-of-paris, all combined substantially in the manner and in about the proportions herein set forth.

In testimony that I claim the foregoing as my own I affix my signature in presence of two witnesses.

OTTO OSWALD KARSCH.

Witnesses:
HENRY ROESCH,
HARMAN MILLER.